Oct. 31, 1967  R. D. ERICKSON  3,350,603
ELECTRONIC FLASH WITH AUTOMATIC TERMINATION MEANS
Filed Aug. 31, 1964
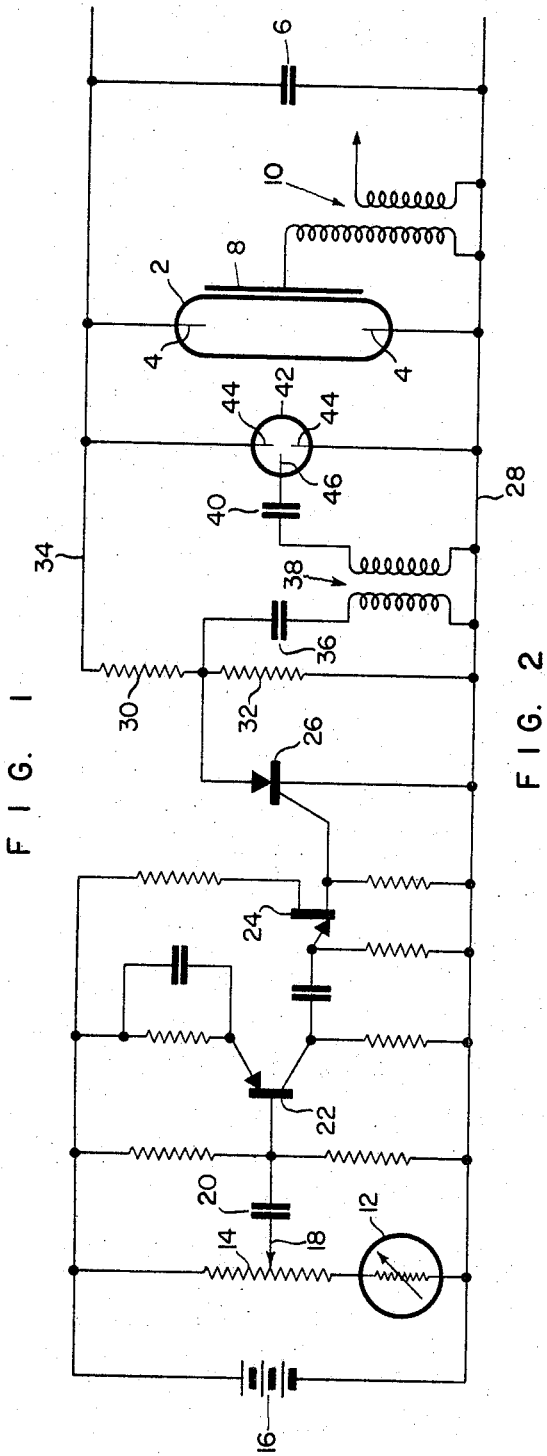
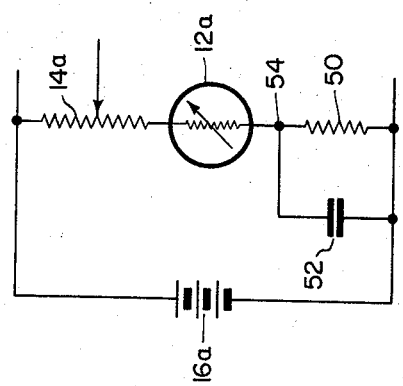
INVENTOR.
ROGER D. ERICKSON
BY *Arthur H. Swanson*
ATTORNEY.

United States Patent Office 3,350,603
Patented Oct. 31, 1967

3,350,603
ELECTRONIC FLASH WITH AUTOMATIC TERMINATION MEANS
Roger D. Erickson, Littleton, Colo., assignor to Honeywell Inc., a corporation of Delaware
Filed Aug. 31, 1964, Ser. No. 393,310
20 Claims. (Cl. 315—151)

ABSTRACT OF THE DISCLOSURE

Flash apparatus which automatically terminates the flash when a predetermined quantity of light is received from the subject being photographed. A semi-conductor photocell receives the light from the subject and produces a signal representataive of the integral of the received light. This signal is applied to a trigger circuit, and triggers the latter when a predetermined signal level is reached. This fires a quench tube connected in parallel with the flash tube, thereby terminating the flash. Electrical or light bias for the photocell compensates for the effects of ambient light on the photocell response.

---

This invention relates to electronic apparatus, and more particularly, to electronic photoflash apparatus.

In the art of photography, cameras and the like have been provided with automatic exposure control means. These means, however, respond only to light which has a persistency which is long compared to the shortest shutter speed available on the camera. The light may be natural or artificial. One form of artificial light which has come into wide use is the so-called electronic flash devices. In such devices, a relatively high voltage charge is stored on a capacitor. Then, at the instant of the taking of a picture, that capacitor is discharged through a gas filled flash tube to provide the desired light. Subsequent to the taking of the picture, a new charge is established and stored on the capacitor in readiness for the next flash discharge through the flash tube. The light flashes produced in such apparatus are normally of extremely short duration, on the order of one millisecond. The automatic exposure control devices heretofore provided for cameras and the like have operated to control either the lens diaphragm opening or the shutter speed or both. When the long persistence light is used, the controlled mechanism sets the desired condition into the camera prior to or during the actual taking of the picture. Such electrical-mechanical systems obviously would not be able to respond fast enough to control the amount of light falling on the film when an electronic flash device is used as the principal light source. Such flash light sources ordinarily produce repeated flashes of light, each with the same light energy content. With such electronic flash light sources, the light falling on the film is controlled by adjusting the camera lens diaphragm. Such an arrangement does not lend itself well to instantaneous automatic exposure control.

It is accordingly an object of the present invention to provide an improved automatic flash exposure control apparatus.

It is a further object of the present invention to provide means for controlling the light energy produced by the electronic flash light source.

It is another object of the present invention to provide, in an electronic flash apparatus, means for controlling the time duration of the flash in accordance with a desired program.

It is still another object of the present invention to provide a light controlled, electronic switch.

In accomplishing these and other objects, there has been provided, in accordance with the present invention, a control circuit for use with an otherwise conventional electronic photoflash apparatus. The control circuit includes a light controlled electronic switch means for extinguishing the flash in the flash tube prior to the normal termination of the flash. The light from the flash is directed toward an object to be illuminated, such as the subject of a photograph. Light reflected from the object falls upon a light sensitive element to produce an electrical signal corresponding to the light energy falling on the light sensitive element. The electrical signal is integrated during the interval of the flash and, when the integrated value of the electrical signal reaches a predetermined value, corresponding to the proper light exposure on the film, a control pulse is generated which, in turn, initiates a short circuit path around the flash tube, thereby extinguishing the flash substantially at the instant of the generation of the control pulse. Since the light falling on the light sensitive element to produce the control pulse is the light reflected from the object, the object-to-light source distance factor is automatically included in the control function. Therefore, a proper exposure is obtained without the need for adjusting the camera lens diaphragm.

A better understanding of this invention may be had from the following detailed description when read in connection with the accompanying drawing, in which:

FIG. 1 is a schematic circuit diagram of an electronic flash control system according to the present invention.

FIG. 2 is a schematic representation of a somewhat different form of a portion of the circuit shown in FIG. 1.

FIG. 3 is a schematic representation of another different form of a portion of the arrangement shown in FIG. 1.

Referring now to the drawing in more detail there is shown in FIG. 1 a control circuit for controlling the flash duration of a light flash produced in an electronic photoflash mechanism. A flash tube 2 is provided with a pair of main current conducting electrodes 4. The electrodes 4 are connected, respectively, to opposite electrodes of a main storage capacitor 6. A trigger electrode 8 is positioned adjacent but external to the flash tube 2. The electrode 8 is connected through a trigger transformer 10 to a control switch (not shown) such as the switch associated with the shutter on photographic cameras. The elements thus far described are part of a conventional electronic photoflash apparatus which may, for example, be of the sort shown in the patent to R. D. Kluge, No. 3,049,611. In the operation of such flash apparatus, a suitable electronic circuit such as that shown in the Kluge patent establishes a relatively high voltage charge across the storage capacitor 6. The stored voltage also appears across the electrodes 4—4 of the flash tube 2. When it is desired to produce a flash of light from the tube 2, a triggering pulse is produced through the transformer 10 and applied to the trigger electrode 8. The pulse initiates a flash discharge between the electrodes 4 of the tube 2. Under normal operations heretofore, the flash continues until the capacitor 6 has discharged through the tube 2 to the point where the voltage will no longer support the flash across the tube 2. That usually requires about one millisecond of time. According to the present invention the maximum time duration of the flash produced across the tube 2 remains at that time determined by the discharge of the capacitor 6 through the tube 2. However in order to automatically adjust the flash for those instances wherein the object requires less than the maximum amount of light, a control circuit is provided for extinguishing the flash at some desired point short of the maximum time duration.

In accomplishing the desired quenching of the flash tube, advantage is taken of a characteristic of certain light sensitive semi-conductor elements. Light sensitive semi-conductor elements such as cadmium-sulfide exhibit a unique response characteristic in that the carriers in the semi-conductor elements which provide electrical conductivity are created extremely fast by exposures to light photons. Additional carriers are created as the element is exposed to a continuing light exposure, providing an integral measure of the total light exposure over short enough times. Thus, the light sensitive semi-conductor elements respond very fast to incident light exposures, with the conductivity increasing in relation to the intensity of light falling on the element. However, with a sudden decrease in incident light, the conductivity of the semi-conductor material decreases slowly. In other words, the conductivity characteristics of these semi-conductor materials exhibits a fast reaction to light exposure and a slow decay time when the light is removed. With this characteristic, the light sensitive semi-conductor comprises, over relatively short intervals, a non-reactive light integrator. This is in contradistinction to those circuits wherein integration of the light-produced signal is accomplished by a capacitance integrating network, or the like, such as that shown in U.S. Patent No. 3,033,988, issued in the name of H. E. Edgerton. The integrator of the present invention provides several distinct advantages over those shown in the prior art. For example, the capacitance type integrator requires that the dark impedance of the photocell be very high, otherwise the photocell impedance upsets the integration characteristics. In order to achieve the high photocell dark impedance with the required high light sensitivity, the light sensitive element must be a photomultiplier tube. Such tubes require a rather complex power supply. This results in a package which is sufficiently bulky as to preclude its use in portable, camera mounted flash equipment. The control system of the present invention, on the other hand, is of such simple and compact structure as to render it readily included in camera mounted equipment. An integrator employing a capacitor, but including a semi-conductor light sensitive element, cannot achieve proper integration without a cumbersome switching or shutter mechanism for turning the integration device on at the time of the flash. The present invention avoids the need for switches or shutters. It must be remembered, of course, that the term "fast reaction time and slow decay time" is relative. The reaction time and decay time are significant only as they are related to the maximum flash interval. It will be remembered that this flash interval is normally of the order of one millisecond. The significance of this relationship will appear hereinafter.

In practicing this invention a photocell 12 having these characteristics is connected in a series circuit with a variable resistor such as a slidewire resistor 14 and a power supply such as a battery 16. The slider 18, which operates in conjunction with the slidewire resistor 14, is connected through a capacitor 20 to the input circuit of a transistor amplifier including the transistor 22. The output of the amplifier is connected through an RC coupling network to the input circuit of a controlled trigger type transistor 24 such as a unijunction transistor. The output of the unijunction transistor is connected in cascade triggering relationship to the control electrode of a silicon controlled rectifier 26. The cathode of the silicon controlled rectifier 26 is connected to a system common or negative lead 28. The anode of the rectifier 26 is connected to the junction between two serially connected resistors 30 and 32. The remote end of the resistor 32 is connected to the lead 28, while the remote end of the resistor 30 is connected to a positive lead 34, which carries the positive potential representative of the charge across the main storage capacitor 6. The junction between the resistors 30 and 32 is also connected through a capacitor 36 to the primary winding of a quench trigger transformer 38. The secondary winding of the trigger transformer 38 is connected through an isolating capacitor 40 to the trigger electrode of a specially designed quench or switch tube 42. The main conductive path of the quench tube 42 is connected in shunt with the main conductive path of the flash tube 2.

There are, of course, certain criteria that must be met in the quench tube 42. To operate effectively, the quench tube 42 must have a relatively low impedance compared with the main flash tube 2. A main flash tube has a minimum impedance of typically 1.5 to 2 ohms. Thus, the quench tube should have an impedance near 0.1 ohm. To provide such a low impedance, the tube should have a low gas pressure and a short electrode spacing. The electrodes must be capable of carrying a very high current for a short time. The tube must be capable of being triggered rapidly and easily into conduction over the range of anode voltages used, typically from 100 volts to 500 volts (the range over which the main flash tube voltage changes during the flash). A tube constructed to meet these specifications was provided with a separation between main electrodes 44 of 0.5 cm. and was filled with xenon gas to a pressure of about 100 mm. Hg. The tube includes an internal trigger electrode 46 spaced midway between the two main electrodes 44. In order to accommodate the relatively high current necessary to effect the quench, the main electrodes were made of a doped sintered tungsten. The tube thus constructed was found to be quite satisfactory in operation.

A circuit constructed in accordance with the foregoing description operates as follows. The series circuit including the battery 16, the photocell 12, and the slidewire resistor 14 constitutes the initial detecting circuit for the light reflected from the object to be photographed. The voltage signal appearing at the slider 18 is a function of the division of voltage across the resistance of the slidewire resistor 14 and the resistance of the photocell 12. This voltage will be stabilized at some value for various conditions of ambient or persistant light. Then, when the flash of light is reflected onto the photocell 12 from the object being photographed, the resistance of the photocell decreases rapidly following the incident flash of light. Since the decay time of the conductivity of the photocell 12 is slow relative to the flash interval, the photocell in and of itself effectively integrates the incident light, converting that incident light into a voltage signal of increasing magnitude appearing at the slider 18. This signal of increasing magnitude is applied to the amplifier transistor 22, thence to the control electrode of the unijunction transistor 24. When the signal at the control electrode of the unijunction 24 has reached a predetermined and fixed breakdown voltage, the unijunction transistor becomes suddenly conductive, producing a sharp pulse of energy to the control electrode of a silicon control rectifier 26. The sharp pulse applied to the control electrode of the silicon control rectifier 26 causes that rectifier to become suddenly conductive, effectively short circuiting the resistor 32. This, in turn, causes the capacitor 36 to discharge, hereby applying a sharp pulse of energy to the primary winding of the trigger transformer 38. The transformer 38 transmits the triggering pulse through the capacitor 40 to the triggering electrode 46 of the quench tube 42. That triggering pulse causes the quench tube 42 to become instantaneously conductive. Since the quench tube 42 has a much lower impedance, when conductive, than does the main flash tube, almost all of the stored energy in the storage capacitor 6 is discharged through the quench tube 42, causing the main flash tube 2 to be extinguished at such time as sufficient light has been reflected onto the photocell 12 to effect the initiation of the quenching.

The slidewire 14 together with the slider 18 acting thereupon comprises means for adjusting the sensitivity of the system to correspond to the sensitivity of the various available films and the lens aperture on the camera. For convenience, the means for adjusting the slider 18 manually may be calibrated directly in terms of A.S.A. film speed ratings and $f$/numbers.

Since the unijunction transistor 24 and the silicon controlled rectifier 26 are both of the so-called controlled trigger type semi-conductors, it might seem that the use of both devices would be superfluous, and in some instances it might even be so. However, the triggering characteristics of the unijunction transistor are much more accurately controllable than are those of the silicon controlled rectifier. The silicon controlled rectifier is used as the main switch because of its power handling capabilities. The capacitor 40 in the triggering circuit of the quench tube is included to preclude the establishment of a discharge path in the trigger electrode circuit of the quench tube.

As was previously noted the decay time characteristic of the photocell is long with respect to the normal flash interval of the flash tube. On the other hand, however, for other considerations it is relatively short. It is this characteristic of the semi-conductor photocells that enable them to be used in the present invention as a light integrator for the light from the flash tube. Further, because of this characteristic it is not necessary to provide shutter or switch means for excluding ambient light effects from the presence of the photocell. For ambient or persistent light conditions, the photocell does not continue to integrate but stabilizes at some value representative of the ambient light. Since the quench control circuit is capacity coupled throughout, the signal representative of the ambient light is not transmitted to the control electrode of the quench tube; only the pulse of energy representative of the integrated quantity of the light reflected from the flash is applied to the control circuit.

Although the signal representative of the ambient light is not directly reflected into the quench control circuit, there is a possibility of a secondary effect which, unless controlled, could produce an error in the control circuit. This secondary effect is in the nature of a variation in the response characteristic of the photocell to a given pulse of light under different conditions of ambient or persistent light. For example, if the voltage pulse produced by the detecting circuit as a result of the incidence of a given pulse of light is of a higher magnitude at a greater ambient light than at a lower ambient light, this increasing ratio obtains up to some maximum value. This effect can be controlled in the instrumentality by one of several ways. One proposed way of controlling this effect is to provide a small light source 56 of constant value within the housing for the apparatus and to which the photocell is exposed as shown in FIG. 3. Alternatively, means may be provided for effecting a compensation of the effect. Such compensation means are illustrated in FIG. 2. In FIG. 2, there is shown a detecting circuit which includes a battery 16a a slidewire resistor 14a and a photocell 12a. These elements are connected in series in a manner comparable to that illustrated in FIG. 1. Also connected in series between the negative terminal of the battery 16a and the photocell 12a, there is a compensating resistor 50. A bias storage capacitor 52 is connected between the junction 54, intermediate the resistor 50 and a photocell 12a, and the negative terminal of the battery, in shunt with the resistor 50.

It has been found that the magnitude of the voltage pulse produced by the photocell as a result of the incidence of a given flash of light varies both of a function of the ambient or persistent light and the magnitude of the bias voltage across the photocell and slidewire resistor. In the circuit FIG. 1, the bias voltage across the photocell 12 and slidewire resistor 14 is constant, applied by the battery 16. On the other hand, in FIG. 2, the bias voltage varies somewhat inversely with the conductivity of the photocell 12a and therefore, in accordance with the ambient light. Thus when the ambient light is low, the impedance of the photocell 12a is high, consequently the voltage across the photocell 12a and slidewire resistor 14a is relatively high. As the ambient light increases, the conductivity of the photocell increases therefore its impedance decreases. As the impedance of the photocell 12a decreases, the bias voltage across the photocell 12a and slidewire resistor 14a decreases. This change in the bias voltage is in a direction to oppose the increased sensitivity of the photocell with ambient light. The capacitor 52 is provided to maintain the bias voltage established at the junction 54 constant during a flash interval. It is obvious that capacitor 52 can produce the same effect by connection between junction 54 and the positive terminal of the battery, in shunt with photocell 12a and the slidewire resistor 14a.

If the voltage pulse produced by the detecting circuit as a result of the incidence of a given pulse of light is of a lower magnitude at a greater ambient light than at a lower ambient light, this decreasing ratio can also be compensated. The internal light source mentioned previously to which the photocell can be exposed will provide a more constant effective ambient. Alternately, a negative amplifier biasing using the photocell as an element in the biasing circuit will provide compensation for ambient effects.

Thus it may be seen that there has been provided in accordance with the present invention an improved automatic flash exposure control apparatus for controlling the light energy produced by an electronic flash source which is characterized in that the time duration of the flash produced by the flash unit is controlled in accordance with a desired program.

What is claimed is:

1. A light responsive control circuit for a flash tube comprising a light sensitive circuit means for producing an electrical signal in response to an incident pulse of light energy, said circuit means including a semiconductor light sensitive element which alone constitutes a substantially non-reactive integrator whereby said electrical signal represents an integration of the light energy of said pulse, trigger circuit means connected to said light sensitive circuit means and responsive to said electrical signal to produce a trigger pulse when said integration electrical signal reaches a predetermined value, a switch circuit means including a switch element in parallel with said flash tube adapted to be rendered conductive upon the applicatiton of a trigger pulse thereto, and means connecting said trigger circuit means to said switch circuit means to control the operation thereof.

2. The invention as set forth in claim 1 wherein said light sensitive circuit means includes a resistor connected in a series circuit with said light sensitive element, and means for connecting an electrical energy source across said series circuit.

3. The invention as set forth in claim 2 wherein said resistor comprises a variable resistor having an adjustable tap cooperatively associated therewith for connection to said trigger circuit.

4. A light responsive control circuit for a flash tube comprising a light sensitive circuit means for producing an electrical signal in response to an incident pulse of light energy, said circuit means having a substantially non-reactive integrator consisting solely of a semi-conductive light sensitive element, and having a resistor and means for connecting an electrical energy source across said element and said resistor in series, whereby said electrical signal represents an integration of the light energy of said pulse; trigger circuit means connected to said light sensitive circuit means and responsive to said electrical signal to produce a trigger pulse when said integration electrical signal reaches a predetermined value, said trigger circuit means including controlled trigger semi-conductor means; switch circuit means including an electronic switch element in parallel with said flash tube adapted to be rendered conductive upon the application of a trigger pulse thereto and means connecting said trigger circuit means to said switch circuit means to control the operation thereof.

5. The invention as set forth in claim 4 wherein said controlled trigger semi-conductor means comprises a unijunction transistor.

6. The invention as set forth in claim 4 wherein said controlled trigger semi-conductor means comprises a unijunction transistor and a silicon controlled rectifier connected in cascade triggering relationship.

7. The invention as set forth in claim 6 wherein said electronic switch element comprises a gas filled tube having a first and second main conductive path electrodes and a trigger electrode, said tube characterized in a very low impedance when conductive and an ability to conduct high currents for short intervals.

8. The invention as set forth in claim 6 and characterized by the addition of electronic amplifier means connected between said light sensitive circuit means, and said trigger circuit means.

9. In an electronic flash circuit wherein an electrical charge stored in a capacitor is selectively discharged through a flash tube, a flash control circuit comprising a light sensitive circuit means responsive to an incident pulse of reflected light energy originating from said flash tube for producing an electrical signal representative of said reflected light energy, said light sensitive circuit means having a substantially non-reactive integrator consisting solely of a semi-conductive light sensitive element, and having a resistor and means for connecting a source of electrical energy across said element and said resistor in series, whereby said electrical signal represents an integration of said light energy pulse; trigger circuit means connected to said light sensitive circuit means and responsive to said electrical signal to produce a trigger pulse when said integration electrical signal reaches a predetermined value, said trigger circuit means including controlled trigger semi-conductor means; switch circuit means including an electronic switch element adapted to be rendered conductive upon the application of a trigger pulse thereto; means connecting said trigger circuit means to said switch circuit means to control the operation thereof; and means for connecting said electronic switch element in shunt with said flash tube whereby to short-circuit said flash tube when said switch element becomes conductive.

10. The invention as set forth in claim 9 wherein said controlled trigger semi-conductor means comprises a unijunction transistor and a silicon controlled rectifier connected in cascade triggering relationship.

11. The invention as set forth in claim 9 characterized by the addition of means for controlling the effect of ambient light on said light sensitive element.

12. The invention as set forth in claim 11 wherein said additional means includes a compensating resistor serially connected between said light sensitive element and said electrical energy source, and a bias storage capacitor connected between the junction of said compensating resistor and said light sensitive element and a point of reference potential.

13. The invention as set forth in claim 11 wherein said additional means comprises a compensating amplifier connected between said light sensitive circuit means and said trigger circuit means.

14. In an electronic flash circuit wherein an electrical charge stored on a capacitor is selectively discharged through a flash tube, a flash control circuit comprising a light sensitive circuit means responsive to an incident pulse of reflected light energy originating from said flash tube for producing an electrical signal representative of said reflected light energy, said light sensitive circuit means having a substantially non-reactive integrator consisting solely of a semi-conductive light sensitive element, and having a resistor and means for connecting a source of electrical energy across said element and said resistor in series, whereby said electrical signal represents an integration of said light energy pulse; an amplifier circuit connected to the output of said light sensitive circuit means for amplifying said electrical signal; trigger circuit means connected to said amplifier circuit and responsive to said amplified electrical signal to produce a trigger pulse when said signal reaches a predetermined value, said trigger circuit means including controlled trigger semi-conductor means; switch circuit means including an electronic switch element adapted to be rendered conductive upon the application of a trigger pulse thereto; means connecting said trigger circuit means to said switch circuit means to control the operation thereof; and means for connecting said electronic switch element in shunt with said flash tube whereby to short-circuit said flash tube when said switch element becomes conductive.

15. A light responsive circuit for a flash tube comprising a light sensitive circuit means operative to produce an electrical output signal in response to an incident pulse of light energy, said circuit means including a semi-conductor light sensitive element which alone constitutes a substantially non-reactive electrical signal integrator whereby said output signal represents an integration of the light energy of said pulse, trigger circuit means connected to said light sensitive circuit means and responsive to said output signal to produce a trigger pulse when said output signal reaches a predetermined value, said trigger circuit including an electrical signal reference means responsive to said predetermined value of said output signal to abruptly change its operating characteristics whereby to produce said trigger pulse, switch circuit means including an electronic switch element in parallel with said flash tube arranged to be rendered conductive upon the application of a trigger pulse thereto and circuit means connecting said trigger circuit means to said switch circuit means to apply said trigger pulse to said switch circuit means to control the operation thereof.

16. In an electronic flash circuit wherein an electrical charge stored on a capacitor is selectively discharged through a flash tube, a flash control circuit comprising a light sensitive circuit means responsive to an incident pulse of reflected light energy originating from said flash tube for producing an electrical signal representative of said reflected light energy, said light sensitive circuit means having a substantially non-reactive integrator consisting solely of a semi-conductive light sensitive element, and having a resistor and means for connecting a source of electrical energy across said element and said resistor in series, whereby said electrical signal represents an integration of said light energy pulse; an amplifier circuit connected to the output of said light sensitive circuit means for amplifying said electrical signal; trigger circuit means connected to said amplifier circuit and responsive to said amplified electrical signal to produce a trigger pulse when said signal reaches a predetermined value, said trigger circuit including an electrical signal reference means responsive to said predetermined value of said amplified electrical signal to abruptly change its operating characteristics whereby to produce said trigger pulse, switch means including an electronic switch element adapted to be rendered conductive upon the application of a trigger pulse thereto; means connecting said trigger circuit means to said switch circuit means to control the operation thereof; and means for connecting said electronic switch element in shunt with said flash tube whereby to short-circuit said flash tube when said switch element becomes conductive.

17. In an electronic flash circuit wherein an electrical charge stored in a capacitor is selectively discharged through a flash tube, a flash control circuit comprising a light sensitive circuit means responsive to incident light energy derived from said flash tube and ambient light, said circuit means including a photocell exposed to said light energy and adapted to change its electrical impedance characteristic in response to said incident light energy and ambient compensating means arranged to affect said photocell to counteract a tendency of the photocell to change its response characteristic in response to changes in the ratio of ambient light to flash tube light comprising said incident light, said photocell constituting a substantially non-reactive integrator means arranged to integrate said incident light and to produce an output signal representative of said integration, trigger circuit means connected to said photocell and responsive to said output signal to produce a trigger pulse when said output signal reaches a predetermined value, switch circuit means including an electronic switch element arranged to be rendered conductive upon the application of a trigger pulse thereto; means connecting said trigger circuit means to said switch circuit means to control the operation thereof; and means for connecting said electronic switch element in shunt with said flash tube whereby to short-circuit said flash tube when said switch element becomes conductive.

18. An electrical flash circuit as set forth in claim 17 wherein said compensating means includes a source of a constant electrical bias signal, a tapped potentiometer having a resistive element and a tap thereon, a fixed resistor and circuit means connecting said photocell, said resistive element of said potentiometer and said resistor in a series circuit across said source, said trigger circuit means being connected to said tap on said potentiometer.

19. An electrical flash circuit as set forth in claim 17 wherein said compensating means includes an auxiliary source of light energy arranged to illuminate said photocell at a predetermined constant level to affect the response characteristic of said photocell.

20. An electronic flash circuit as set forth in claim 17 wherein said trigger circuit means includes a unijunction transistor and a silicon controlled rectifier connected in a cascade triggering relationship.

References Cited
UNITED STATES PATENTS

| | | | |
|---|---|---|---|
| 2,849,623 | 8/1958 | Drake | 250—214 |
| 3,033,988 | 5/1962 | Edgerton | 250—205 |
| 3,056,332 | 10/1962 | Beregowitz | 250—211 X |
| 3,176,189 | 3/1965 | Tabet | 307—88.5 |
| 3,209,154 | 9/1965 | Maring | 250—206 X |

WALTER STOLWEIN, *Primary Examiner.*